(12) United States Patent
Ogasawara et al.

(10) Patent No.: US 8,149,356 B2
(45) Date of Patent: Apr. 3, 2012

(54) LIQUID CRYSTAL DISPLAY DEVICE, POLARIZING PLATE AND BACKLIGHT SOURCE

(75) Inventors: Toyokazu Ogasawara, Kanagawa (JP); Tsuyoshi Maeda, Yamanashi (JP)

(73) Assignee: Sony Corporation, Tokyo (JP)

( * ) Notice: Subject to any disclaimer, the term of this patent is extended or adjusted under 35 U.S.C. 154(b) by 207 days.

(21) Appl. No.: 12/420,233

(22) Filed: Apr. 8, 2009

(65) Prior Publication Data

US 2009/0256995 A1    Oct. 15, 2009

(30) Foreign Application Priority Data

Apr. 10, 2008    (JP) ................ P2008-102745

(51) Int. Cl.
*G02F 1/1335*    (2006.01)
(52) U.S. Cl. .................. 349/104; 349/106; 349/162
(58) Field of Classification Search .................. None
See application file for complete search history.

(56) References Cited

U.S. PATENT DOCUMENTS

| 6,147,740 A * | 11/2000 | Yoshida et al. ............... 349/165 |
| 2006/0291236 A1* | 12/2006 | Hsu et al. ...................... 362/561 |
| 2007/0247567 A1* | 10/2007 | Sato et al. ...................... 349/96 |
| 2009/0115935 A1* | 5/2009 | Maeda et al. ................... 349/62 |
| 2009/0251636 A1* | 10/2009 | Maeda et al. ................... 349/62 |

FOREIGN PATENT DOCUMENTS

| JP | 10-293299 | 11/1998 |
| JP | 2007-316156 | 12/2007 |

* cited by examiner

*Primary Examiner* — Mike Stahl
(74) *Attorney, Agent, or Firm* — Finnegan, Henderson, Farabow, Garrett & Dunner, L.L.P.

(57) ABSTRACT

A liquid crystal display device according to the present invention includes a liquid crystal panel which has a liquid crystal cell including a predetermined liquid crystal layer and polarizing plates for holding the liquid crystal cell, a backlight source which is arranged on the rear side of the liquid crystal panel, for irradiating the liquid crystal panel with white light, and an absorbing layer which is arranged between the backlight source and the liquid crystal cell, for absorbing only the light of the wavelength band corresponding to a changed color of the white light while passing through the liquid crystal panel in the oblique direction with respect to the normal direction of the liquid crystal panel.

10 Claims, 7 Drawing Sheets

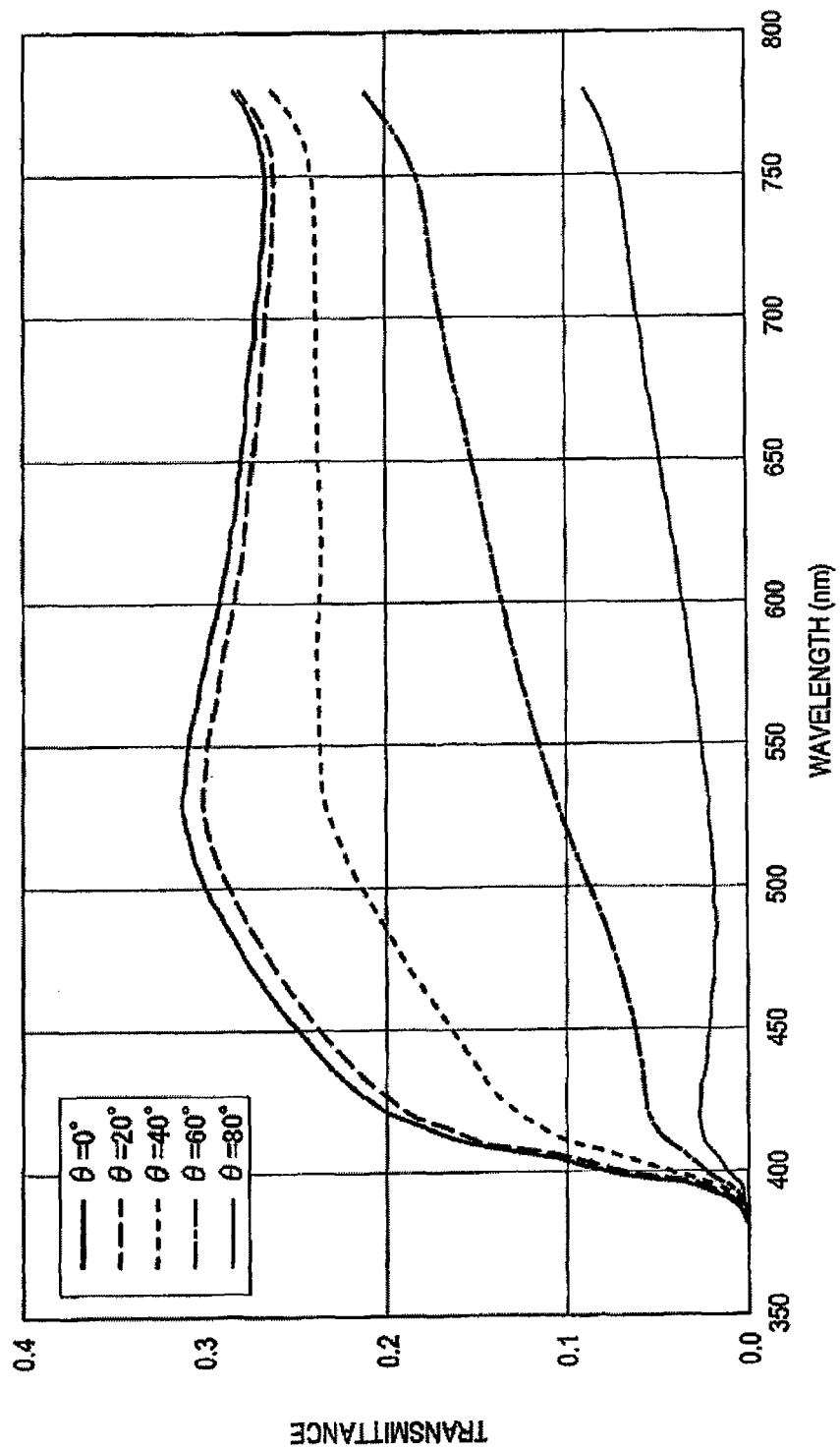

LIQUID CRYSTAL DISPLAY DEVICE, POLARIZING PLATE AND BACKLIGHT SOURCE

BACKGROUND OF THE INVENTION

1. Field of the Invention

The present invention relates to a liquid crystal display device, a polarizing plate and a backlight source.

2. Description of the Related Art

Liquid crystal display devices are in widespread use for monitors of a personal computer and a portable device and a television because of various advantages that they realize low voltage and low power consumption and they can be formed into a thinner film, downsized, or large-screen design. This liquid crystal display device has been provided in various modes according to the arrangement state of liquid crystals of a liquid crystal substance layer: for example, a TN (Twisted Nematic) mode, an IPS (In-Plane Switching) mode, an OCB (Optically Compensatory Bend) mode, a VA (Vertically Aligned: vertical orientation) mode. Especially a liquid crystal of the VA mode, of the above modes, has attracted attentions over these years because of its high contrast capability.

This liquid crystal of the VA mode, however, has an issue that the hue in the case of observing the liquid crystal from a normal direction is different from the hue in the case of observing it from a wide-angle direction in white display.

In Japanese Patent Application Laid-Open No. 2007-316156, coloring of the screen in the case of observing the liquid crystal panel obliquely is suppressed by providing an optical element which reduces the transmittance of a visible light having the wavelength of 600 nm or more supplied from a backlight source much more in the case of illuminating it obliquely than in the case of illuminating it from a light emitting surface of the liquid crystal panel in a perpendicular direction.

SUMMARY OF THE INVENTION

Though a change in the transmittance at a slant angle of view must have the same degree as a change in the liquid crystal display device, the optical element described in Japanese Patent Application Laid-Open No. 2007-316156 has the layers of different refractive indexes stacked there and therefore, a behavior of a change in the transmittance becomes different. Therefore, there is such an issue that a degree of its effect is various depending on the direction of viewing the liquid crystal display device and that the change of color may be more remarkable.

The present invention has been made in views of such issues, and it is desirable to provide a new and improved liquid crystal display device, polarizing plate, and backlight source which can suppress a hue change observed from a wide-angle effectively in white display.

According to an embodiment of the present invention, there is provided a liquid crystal display device having: a liquid crystal panel which has a liquid crystal cell including a predetermined liquid crystal layer and polarizing plates for holding the liquid crystal cell; a backlight source which is arranged on the rear side of the liquid crystal panel, for irradiating the liquid crystal panel with white light; and an absorbing layer which is provided between the backlight source and the liquid crystal cell, for absorbing only the light of a wavelength band corresponding to a changed color of the white light while passing through the liquid crystal panel in an oblique direction with respect to a normal direction of the liquid crystal panel.

According to the structure, the absorbing layer absorbs only the light of the wavelength band corresponding to a changed color of the white light while passing through the liquid crystal panel in the oblique direction with respect to the normal direction of the liquid crystal panel, from the white light illuminated from the backlight source.

The absorbing layer may absorb the light of a wavelength band corresponding to a hue of yellow-red color.

The absorbing layer may be formed by a chemical compound having the maximum absorption wavelength existing in a visible light region of 580 nm or more.

The transmittance of the absorbing layer in the normal direction may be 60% or more in the visible light region.

The absorbing layer may be provided as an optical film arranged on the path of the white light and may be provided as an adhesive layer for attaching the liquid crystal cell to the polarizing plate adhesively. The absorbing layer may be provided in the backlight source.

It is preferable that a scattering member for scattering the light having passed through the absorbing layer does not exist between the absorbing layer and the liquid crystal panel.

In order to solve the above issue, according to another embodiment of the invention, there is provided a polarizing plate for a liquid crystal display device having: a polarizing layer which controls the polarization of incident light; and an absorbing layer which is provided on the path of the incident light, for absorbing from the incident light, the light of a wavelength band corresponding to a changed color of the white color while passing through the liquid crystal panel in the oblique direction with respect to the normal direction of the liquid crystal panel included in the liquid crystal display device.

In order to solve the above issue, according to further another embodiment of the invention, there is provided a backlight source for liquid display device having: a light source unit which irradiates white light; a scattering layer which scatters the white light; and an absorbing layer which is arranged on a path of the white light, for absorbing from the white light, the light of a wavelength band corresponding to a changed color of the white light while passing through a liquid crystal panel in an oblique direction with respect to a normal direction of the liquid crystal panel included in the liquid crystal display device.

According to the embodiments of the present invention described above, it is possible to effectively control a hue change observed from the wide-angle in the white display.

BRIEF DESCRIPTION OF THE DRAWINGS

FIG. 7 is a graph showing the spectral transmittance in the liquid crystal display device in related art.

DETAILED DESCRIPTION OF THE PREFERRED EMBODIMENTS

Figure 1:
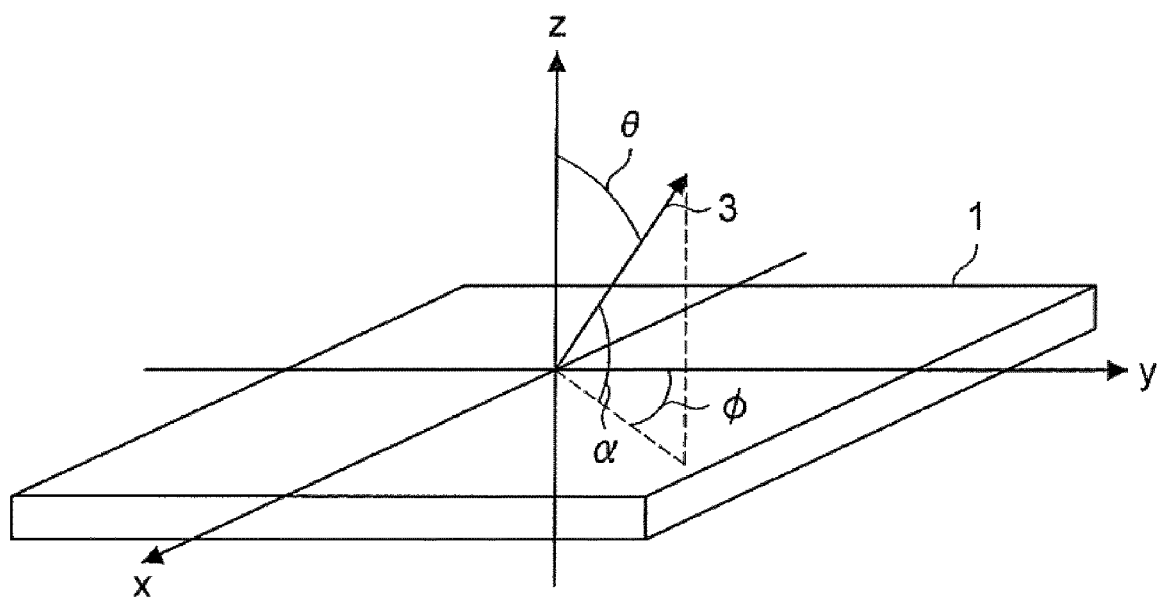
FIG. 1 is a view for explaining definition of a coordinate system.

Hereinafter, preferred embodiments of the present invention will be described in detail with reference to the appended drawings. Note that, in this specification and the appended drawings, structural elements that have substantially the same function and structure are denoted with the same reference numerals, and repeated explanation of these structural elements is omitted.

<Definition of Coordinate System>

At first, definition of a coordinate system used in this specification will be described. In this specification, a coordinate system as illustrated in FIG. 1 is adopted with the plane surface of a substrate 1 defined as an xy-plane and the vertical direction of the substrate 1 defined as a z-axis direction. When a vector 3 is defined, an angle $\theta$ formed by the vector 3 and the z-axis is defined as a polar angle and an angle $\phi$ formed by the projection on the xy plane surface of the vector 3 and the y-axis is defined as an azimuth. Here, the direction of the vector 3 in FIG. 1 is for convenience in description and it may be from the positive side of the z-axis to the negative side, alternatively it may be from the negative side of the z-axis to the positive side. Here, the vector 3 may be a longitudinal direction of molecule of a liquid crystal substance and a pigment, or it may be a direction of view when obliquely viewing the liquid crystal display device with the substrate 1 as the display surface of the liquid crystal display device.

<Liquid Crystal Display Device in Related Art>

Figure 6:
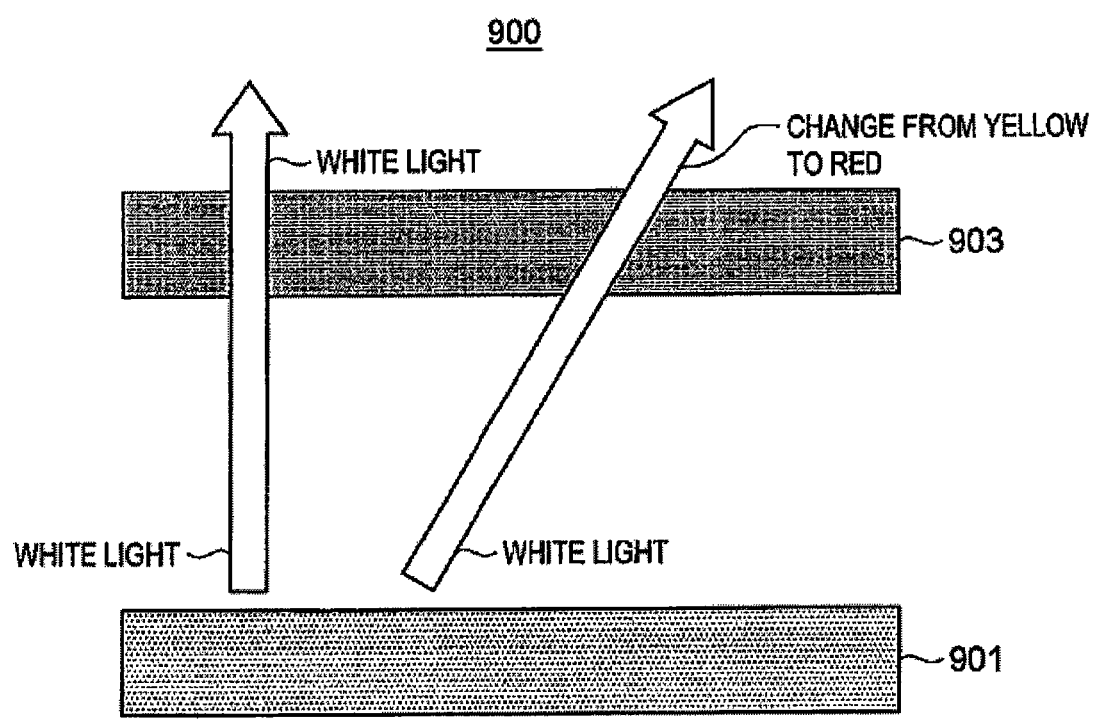
FIG. 6 is a view for explaining a hue change in the liquid crystal display device in related art.

Prior to the description of the liquid crystal display device according to the first embodiment of the invention, drawbacks of the liquid crystal display device in related art will be specifically described with reference to FIG. 6 and FIG. 7. FIG. 6 is a view for explaining a hue change in the liquid crystal display device in related art.

The liquid crystal display device 900 in related art mainly includes, for example, a backlight source 901 and a liquid crystal panel 903, as illustrated in FIG. 6.

The backlight source 901 is an irradiating unit which irradiates the liquid crystal panel 903 described later, for example, with white light.

The liquid crystal panel 903 controls transmission/shielding of the light irradiated from the backlight source 901 according to the on/off voltage applied to an electrode (not illustrated) provided in the liquid crystal panel 903.

The liquid crystal display device 900 in related art as shown in FIG. 6 has such an issue that a white light entering the liquid crystal panel 903 vertically passes through the liquid crystal panel 903 as the white light, but a white light entering the liquid crystal panel 903 obliquely is tinged with yellow after passing through the liquid crystal panel 903.

Next, referring to FIG. 7, the above-mentioned issue will be described in detail. FIG. 7 is a graph showing spectral transmittance in the liquid crystal display device in related art.

FIG. 7 is a spectrum of white display when viewing the liquid crystal display device obliquely from the azimuth $\phi=45°$ in the case where the display surface of the liquid crystal display device of a vertical alignment liquid crystal mode (VA mode) is defined as the substrate 1 in FIG. 1 and the direction of view is defined as the vector 3 in FIG. 1. The horizontal axis of FIG. 7 shows wavelength and the vertical axis of FIG. 7 shows transmittance. In the spectrum shown in FIG. 7, an angle formed by the direction of view and the normal direction of the liquid crystal display device (that is, the polar angle $\theta$) is changed from 0° to 80° for every twenty degrees, to perform the measurement.

With reference to FIG. 7, it is found that the transmittance of the blue wavelength band is more reduced than that of the yellow-red color wavelength band (wavelength band at the side of the longer wavelength) according as the polar angle $\theta$ gets larger. It is found that the color viewed from the front direction changes from white to yellow-red according as the polar angle $\theta$ gets larger. This tendency is remarkable in the spectrum at the polar angle $\theta$ of 60°. The result indicates that even in the case of white display, an observer may recognize it as an image tinged with yellow when he or she observes the liquid crystal display device of the vertical alignment liquid crystal mode from the wide-angle, in other words, that there occurs a hue change when observing the liquid crystal display device from the wide-angle.

In order to overcome the issue about his characteristic of viewing angle, the above-mentioned Patent Document 1 is provided with an optical element which reduces the transmittance of a visible light having the wavelength of 600 nm or more supplied from a backlight source much more in the case of illuminating it obliquely than in the case of illuminating it from a light emitting surface of the liquid crystal panel in a perpendicular direction. The liquid crystal display device described in Patent Document 1 suppresses the coloring of a screen when observing the liquid crystal panel obliquely, by providing the optical element.

The screen viewed obliquely, however, does not always change to yellow-red color in some design of the liquid crystal display device. Therefore, in order to obtain the better effect, a design suitable for the liquid crystal display device is necessary, in other words, it is necessary to control the visible light having the same wavelength as the tinge appearing when obliquely observing the liquid crystal display device. A change in the transmittance in a slant angle of view must have the same degree as a change in the liquid crystal display device, but since the layers having the different refractive indexes are stacked on the optical element described in the above Patent Document 1, the behavior of the change in the transmittance becomes different. Therefore, there is such an issue that the degree of its effect is various depending on the direction of watching the liquid crystal display device and that the change of color may be more remarkable.

The inventors of the present invention have made intensive studies to overcome the issue and conceived a liquid crystal display device, a polarizing plate, and a backlight source described below.

First Embodiment

<Outline of Liquid Crystal Display Device>

Figure 2A:
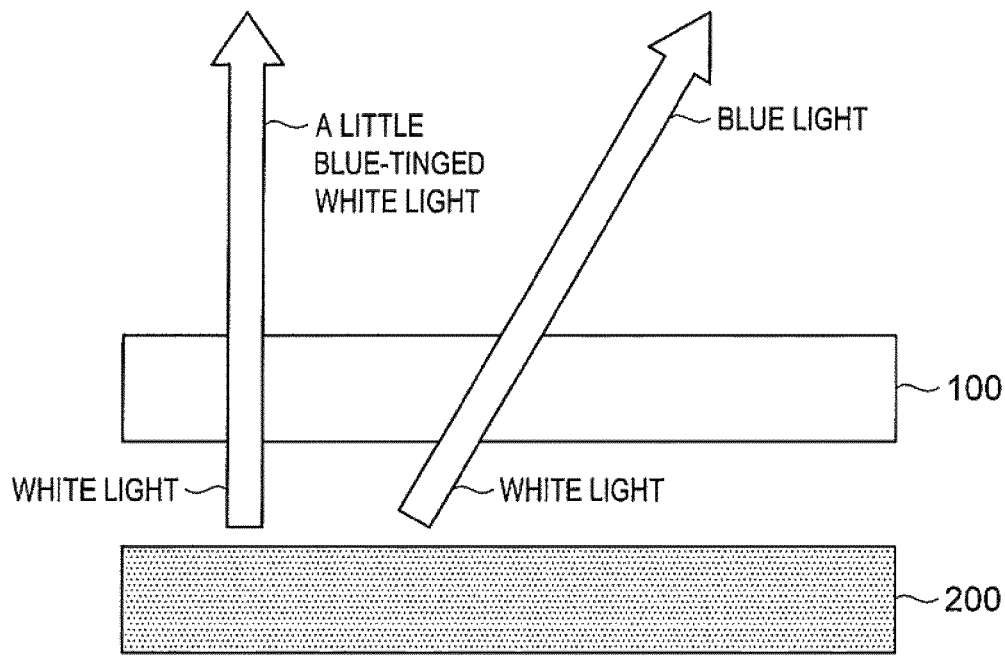
FIG. 2A is a view for explaining an outline of a liquid crystal display device having an absorbing layer according to a first embodiment of the invention.
Figure 2B:
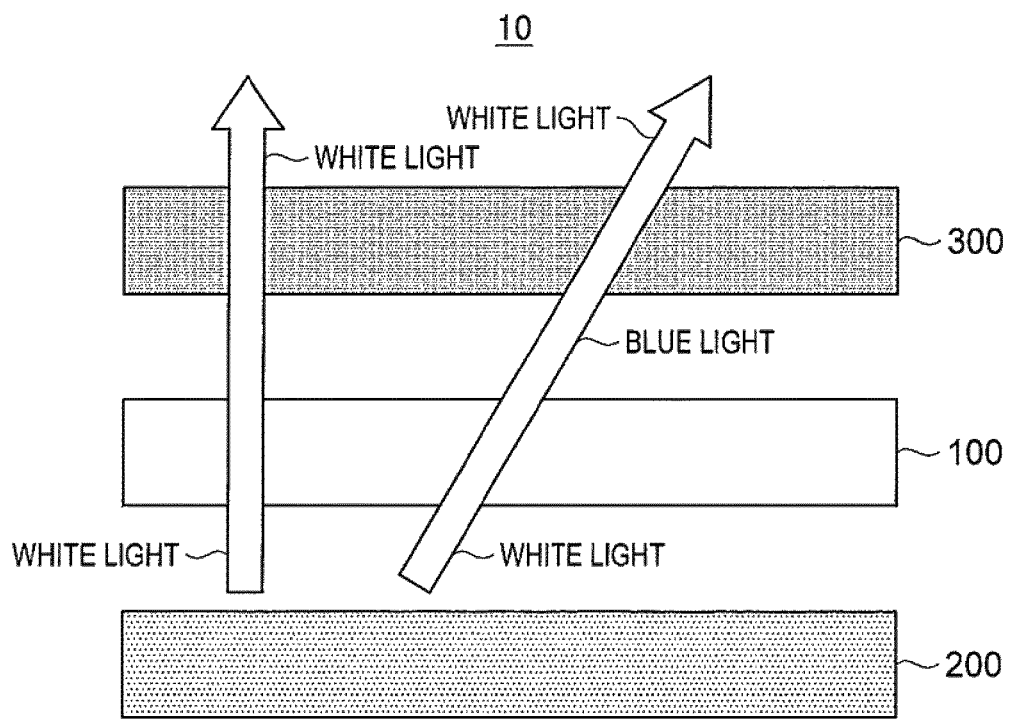
FIG. 2B is a view for explaining an outline of a liquid crystal display device having an absorbing layer according to a first embodiment of the invention.

With reference to FIGS. 2A and 2B, an outline of a liquid crystal display device according to a first embodiment of the invention will be described in detail. FIGS. 2A and 2B are view for explaining the outline of the liquid crystal display device having an absorbing layer according to the embodiment.

As shown in FIG. 2A, an absorbing layer 100 according to the embodiment absorbs a predetermined wavelength band from the white light illuminated from a backlight source 200. As mentioned above with reference to FIG. 6, a hue change occurs in the white light passing through the liquid crystal panel in the oblique direction from the normal of the liquid crystal panel. The absorbing layer 100 according to the embodiment is formed to absorb the wavelength band corresponding to the color change into which the white light is changed after passing through the liquid crystal panel obliquely. When the white light passes through the liquid crystal panel obliquely as shown in FIG. 6, the absorbing layer 100 according to the embodiment absorbs the light of the wavelength band, for example, of 560 nm to 780 nm corresponding to yellow-red when color changes from white to yellow-red color.

When the absorbing layer 100 absorbs the light of the above-mentioned wavelength band, the white light changes into the color light which is a complementary of the color corresponding to the absorbed wavelength band. When the absorbing layer 100 absorbs, for example, the wavelength band corresponding to the yellow-red color as mentioned above, the white light which has passed through the absorbing layer 100 changes into blue light.

At the time, the degree that the white light changes to the blue light depends on the light path length of the light passage through the absorbing layer 100. Therefore, the white light passing through the absorbing layer 100 in the vertical direction becomes the white light tinged with blue slightly, as shown in FIG. 2A, but the light passing through the absorbing layer 100 obliquely becomes the light more tinged with blue according to as increase in the angle formed by the normal of the absorbing layer 100 and the direction of the light proceeding.

Therefore, when the absorbing layer 100 according to the embodiment is arranged between a backlight source 200 and a liquid crystal panel 300 as shown in FIG. 2B, the white light going in the oblique direction becomes a blue light after passing through the absorbing layer 100 and enters the liquid crystal panel 300. Since the light passing through the liquid crystal panel 300 in the oblique direction is tinged with yellow, the incident blue light becomes white and comes out from the liquid crystal panel 300 as the white light as the result.

<Structure of Liquid Crystal Display Device>

Figure 3:
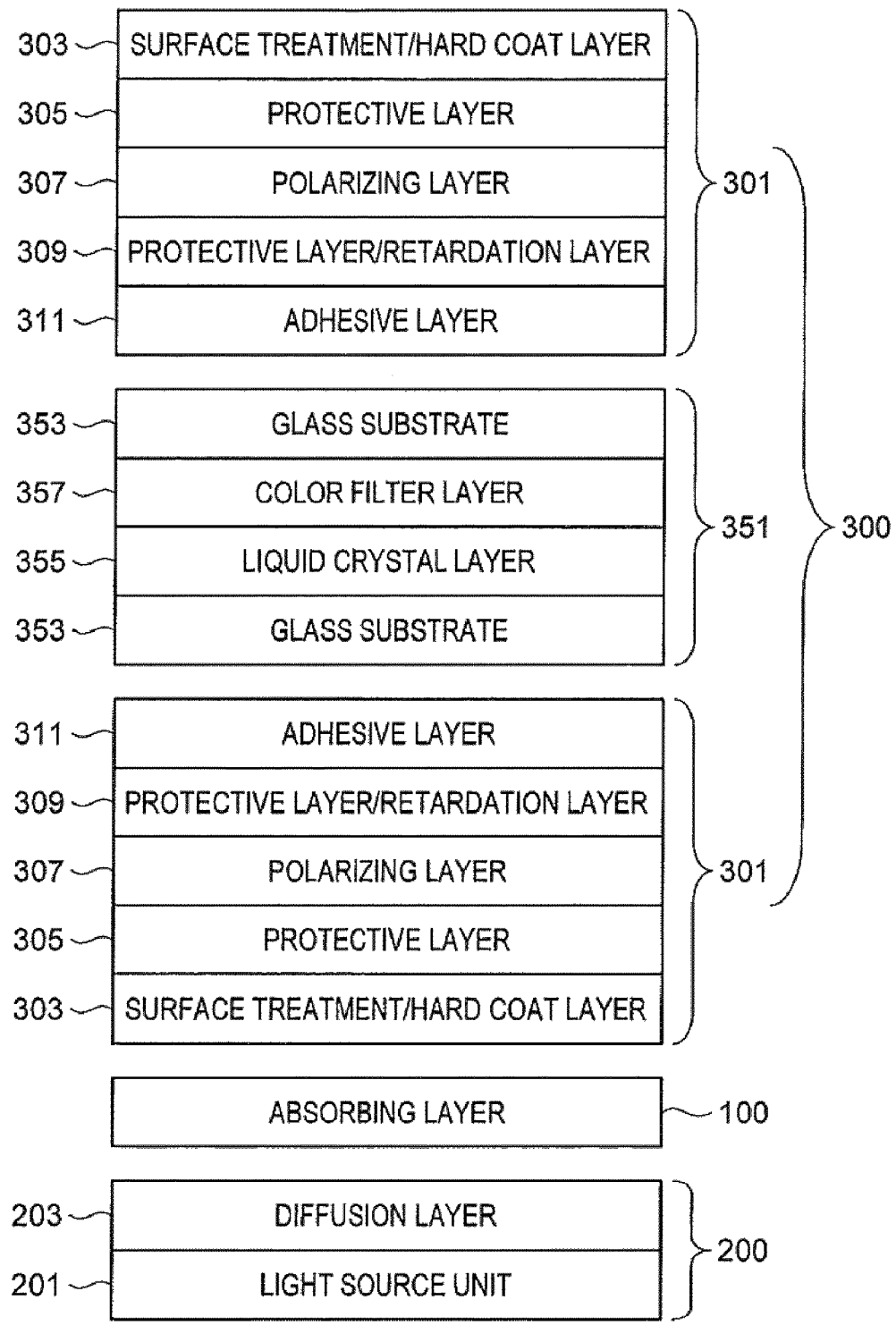
FIG. 3 is a view for explaining the liquid crystal display device having the absorbing layer according to the embodiment.

With reference to FIG. 3, the liquid crystal display device according to the embodiment will be described in detail. FIG. 3 is a view for explaining the liquid crystal display device having the absorbing layer according to the embodiment.

The liquid crystal display device 10 according to the embodiment mainly includes, for example, the absorbing layer 100, the backlight source 200, and the liquid crystal panel 300, as illustrated in FIG. 3.

[Absorbing Layer 100]

The absorbing layer 100 is a member arranged on the path of the white light illuminated from the backlight source 200 described later (any portion between the backlight source 200 and a liquid crystal cell described later). The absorbing layer 100 is provided between the backlight source 200 and the liquid crystal panel 300 in the example shown in FIG. 3. The absorbing layer 100 absorbs a predetermined wavelength band from the white light illuminated from the backlight source 200 and passes the light with a part of the wavelength band absorbed, through the liquid crystal panel 300 arranged on the absorbing layer 100. The details of the absorbing layer 100 will be described later.

[Backlight Source 200]

The backlight source 200 is an irradiating unit which irradiates the absorbing layer 100 and the liquid crystal panel 300 with the white light. The backlight source 200 according to the embodiment mainly includes a light source unit 201 and a diffusion layer 203 as shown in FIG. 3.

The light source unit 201 includes a light source such as a cold-cathode fluorescent lamp (CCFL), a flat fluorescent lamp (FFL), an electro luminescence (EL) element, and a light emitting diode (LED). The light source unit 201 according to the embodiment is not limited to the above-mentioned examples but any light source that can irradiate a white light is available.

The diffusion layer 203 is to diffuse the white light illuminated from the light source unit 201 in order to uniformly illuminate the absorbing layer 100 and the liquid crystal panel 300 described later with the white light. The diffusion layer 203 uses the reflection of a light on an interface of different refractive index. The diffusion layer 203 can be formed by mixing a material (filler) having a refractive index different from a resin into the transparent resin or by providing geometrical convexo-concave portions on the transparent substrate. The haze value of the diffusion layer 203 can be defined, for example, as 50 to 99.9%.

[Liquid Crystal Panel 300]

The liquid crystal panel 300 controls the transmission/shielding of the light passing through the backlight source 200 and the absorbing layer 100 according to the on/off voltage applied to the electrodes (not illustrated) provided in the liquid crystal panel 300. The liquid crystal panel 300 has the pixels aligned flatly and the electrodes (not illustrated) for applying a predetermined voltage to the respective pixels. As shown in FIG. 3, the liquid crystal panel 300 mainly includes, for example, two polarizing plates 301 and a liquid crystal cell 351 sandwiched between these polarizing plates 301.

As shown in FIG. 3, the polarizing plate 301 mainly includes a surface treatment/hard coat layer 303, a protective layer 305, a polarization layer 307, a protective layer/retardation layer 309, and an adhesive layer 311.

The surface treatment/hard coat layer 303 is positioned at the outermost surface of the liquid crystal panel 300 to coat the polarizing plate 301 to secure the predetermined strength. The surface treatment/hard coat layer 303 is formed by using various kinds of usual devices such as a bar coater, a blade coater, a spin coater, a reverse coater, a die coater, or a spray.

The protective layer 305 supports the polarization layer 307 described later and protects the polarization layer 307 from heat and water to inhibit the deterioration of the polarization layer 307. The protective layer 305 is preferable to be formed of a material without optical anisotropy and triacetyl cellulose (TAC) is taken as an example of the material.

The polarization layer 307 controls the polarization of the light entering the polarizing plate 301 and passes only the light having a predetermined polarization component. The polarization layer 307 is formed, for example, of an orientation-controlled resin. There is a uniaxially-stretched polyvinyl alcohol resin as an example of the resin. The direction of the polarization axis of the polarization layer 307 is determined according to the orientation of a liquid crystal substance used for the liquid crystal cell 351 described later.

The protective layer/retardation layer 309 is a layer for protecting the polarization layer 307 and controlling the phase difference of the incident light. The protective layer/retardation layer 309 compensates the phase difference generated in the incident light by adding a predetermined phase difference to the incident light. The protective layer/retardation layer 309 can be formed of the orientation-controlled resin. There is a uniaxially-stretched polycarbonate resin as an example of the resin. It is possible to improve a contrast and a viewing angle of the liquid crystal panel 300 by providing the protective layer/retardation layer 309.

The adhesive layer 311 is a layer including an adhesive agent for attaching the polarizing plate 301 to the liquid crystal cell 351. Examples of the adhesive agent include, for example, acrylic resin, silicon resin, urethane resin, polyvinyl butyral resin, ethylene-acetic vinyl resin, polyvinyl ether resin, saturation formless polyester, and melamine resin.

The liquid crystal cell 351 mainly includes, for example, glass substrates 353, a liquid crystal layer 355, and a color filter layer 357, as illustrated in FIG. 3.

The glass substrates 353 are provided on and under the liquid crystal layer 355 described later, in order to support a liquid crystal substance forming the liquid crystal layer 355. These glass substrates 353 are formed of glass containing a predetermined component. A predetermined metal and indium-tin oxide (ITO) are used to form patterned electrodes (not illustrated) between the glass substrate 353 and the liquid crystal layer 355.

In order to control the orientation of the liquid crystal substance forming the liquid crystal layer 355 described later, so-called orientation processing may be performed on the surfaces of the glass substrate 353. There are the processing (so-called, rubbing processing) of forming an orientation film on the surfaces of the glass substrate 353 by using polyimide before rubbing the formed thin film in a predetermined direction and the processing for forming a photo-alignment film on the surfaces of the glass substrate 353 before illuminating there with the light of a predetermined wavelength as examples of the orientation processing. The orientation processing may be performed on the electrodes (not illustrated) formed on the surfaces of the glass substrate 353.

The liquid crystal layer 355 is a film formed of a predetermined liquid crystal substance. The liquid crystal substance forming the liquid crystal layer 355 is oriented in a predetermined direction. Here, all the liquid crystal substances are not completely oriented in the same direction, but each liquid crystal substance is oriented in the predetermined direction on average.

Each pixel forming the liquid crystal layer 355 may be divided into two or four regions (domains) of orientation in order to improve the viewing angle property not to deteriorate the display quality even when it is viewed obliquely. The orientation division of the liquid crystal layer 355 can be realized by forming each predetermined slit and each rib of a predetermined shape on the electrodes formed on the glass substrate 353.

The color filter layer 357 is provided on the liquid crystal layer 355 and works as a band-pass filter in a visible light band. The color filter layer 357 is formed in a way that three kinds of microscopic color filters respectively passing red light only, green light only, and blue light only have a predetermined plane surface arrangement. The color filter layer 357 is formed of pigments, colorants, and dyes each absorbing each predetermined wavelength light.

It is preferable that a scattering member such as a scattering filter of scattering the light passing through the absorbing layer 100 is not provided between the absorbing layer 100 and the liquid crystal panel 300. This is because when the scattering member is provided, the blue light passing through the absorbing layer 100 and going in the wide-angle direction is scattered by the scattering member and it does not go in the wide-angle direction.

<Details of Absorbing Layer 100>

Next, the absorbing layer 100 according to the embodiment will be more specifically described.

As mentioned above, the absorbing layer 100 according to the embodiment is formed to absorb from the white light, the wavelength band corresponding to the changed color light of the white light which obliquely passes through the liquid crystal panel. The absorbing layer 100 is manufactured by mixing the pigments of absorbing the above wavelength band in a predetermined substrate and heat-molding the above.

It is preferable to use a resin having a high transparency for the substrate of the absorbing layer 100. Examples of the above resin include, for example, polyethylene terephthalate, polyether sulphon, polystyrene, polyethylene naphthalate, polyarylate, polyether ether ketone, polycarbonate, polyethylene, polypropylene, polycycloolefin, polyamide of nylon 6, polyimide, cellulose resin such as triacetyl cellulose, polyurethane, fluorinated resin such as polytetra fluoroethylene, vinyl compound such as polyvinyl chloride, polyacrylic acid, polyacrylic acid ester, polyacrylic nitrile, add-polymer of vinyl compound, polymethacylic acid, polymethyl methacrylate ester, vinylidene compound of polyvinylidene chloride, fluoride vinylidene/trifluoroethylene copolymer, vinyl compound such as ethylene/acetic vinyl copolymer or copolymer of fluorine compound, polyether such as polyethylene oxide, epoxy resin, polyvinyl alcohol, and polyvinyl butyral. The resin used for the substrate according to the embodiment, however, is not limited to the above-mentioned resins.

The pigment mixed into the above substrate is preferable to absorb the light corresponding to the wavelength band, for example, of 560 nm to 780 nm and further preferable to have the maximum absorption wavelength in the visible light region of 580 nm or more. The pigment may be dyes or colorants. There are chemical compounds of xanthenes, squarylium, cyanin, oxonol, azo, pyrromethene, and porphyrin as a specific example of the pigment.

The transmittance of the absorbing layer 100 according to the embodiment in the normal direction of the layer is preferable to be 60% or more in the visible light region. When the transmittance in the normal direction is less than 60%, the amount of the light passing through the absorbing layer 100 is reduced, the brightness of the liquid crystal display device 10 is reduced, and the white light itself having passed in the normal direction is much tinged with blue, which is not favorable.

The amount of the white light passing through the absorbing layer 100 may be controlled by adjusting the density of the pigment added into the substrate with the film thickness of the absorbing layer 100 fixed or by adjusting the film thickness of the absorbing layer 100 with the density of the pigment added to the substrate fixed and changing the optical path length of the white light passing through the absorbing layer 100. The light amount of the white light absorbed by the pigment may be determined by adjusting both the additive amount of the pigment and the film thickness of the absorbing layer 100.

<Method of Manufacturing Absorbing Layer 100>

There is, for example, the following method as a method of manufacturing the absorbing layer 100 according to the embodiment.

A first method is to add the pigment to powder and pellet of a base resin and heats it 150° C. to 350° C. to be melt while taking the melting temperature of the resin into consideration, and preferably after kneading, to form it to manufacture a plastic sheet. The above-mentioned condition is just an example, the processing temperature and the condition for making a film or a sheet are different according to the pigment and the base resin. A second method is to make a film through T-dye molding using an extrusion machine. A third method is to obtain a sheet or a film by stretching the whole sheet or film obtained through the above-mentioned T-dye molding and calendaring molding. For the purpose to make the molding easy, additive used for the general resin forming such as plasticizer may be added. Though the additive amount of the pigment is different according to the absorption factor of the pigment, the thickness of the polymer sheet or film used as the substrate, and the desired transmission property, it may be some mass number ppm to some mass % of the resin as the substrate.

Besides the above-mentioned method, a method according to the casting can be used as a fourth method of obtaining a sheet or a film. The method according to the casting is carried out, for example, in the following process. At first, pigment is added and melted to the resin solution in which a resin or a resin monomer is solved in an organic solvent and plasticizer, polymerization initiator, and antioxidant are added there depending on the necessity. Next, the adjusted solution is poured into a mold having a desired state of surface. After performing polymerization of the resin monomer according to the necessity, a solvent is volatilized and dried. The absorbing layer 100 using the plastic board and the polymer film can be manufactured by performing the above processing.

In the method according to the casting, aliphatic polyester resin, acrylic resin, melamine resin, urethane resin, aromatic ester resin, polycarbonate resin, aliphatic polyolefin resin, aromatic polyolefin resin, polyvinyl resin, polyvinyl alcohol resin, polyvinyl denatured resin (PVB and EVA), or monomer of these copolymer resins can be used as the resin and the resin monomer. A halogen compound, alcohols, ketones, esters, an aliphatic hydrocarbon compound, aromatic hydrocarbon compound, ethers, or the mixture thereof can be used as the solvent. The density of the pigment is different according to the absorption factor of the pigment, the thickness of the polymer sheet or film used as the substrate, and a desired transmission property, but it can be some ppm to some % of the mass of the resin monomer.

Besides the above-mentioned methods, a method of performing the coating can be used as a fifth method for obtaining a sheet or a film. This method includes a method of solving the pigment into a binder resin and an organic solvent, hence to make it something like paint and a method of dispersing the pulverized pigment (grain size about 50 to 500 nm) to an uncolored acrylic emulsion paint, hence to make acrylic aqueous emulsion paint.

In the above-mentioned methods of changing the pigment to the paint, fatty ester resin, aromatic ester resin, acrylic resin, melamine resin, urethane resin, polycarbonate resin, fatty polyolefin resin, aromatic polyolefin resin, polyvinyl resin, polyvinyl alcohol resin, polyvinyl denatured resin (PVB and EVA) or their copolymer resin can be used as the binder resin. A halogen compound, alcohols, ketones, esters, an aliphatic hydrocarbon compound, an aromatic hydrocarbon compound, ethers, or the mixture thereof can be used as the solvent. The density of the pigment is different according to the absorption factor of the pigment, the thickness of a desired coating, and a desired optical property, but it can be 0.1 mass % to 30 mass %. The binder resin density can be some mass % to 80 mass % of the whole paint.

Similarly, the acrylic aqueous emulsion paint can be obtained by dispersing the pulverized pigment to the uncolored acrylic emulsion paint. The antioxidant and the UV absorbent material may be added to the paint.

With the paint manufactured in each of the above-mentioned methods, the coating using a bar coater, a blade coater, a spin coater, a reverse coater, a die coater, or a spray is performed on a transparent polymer film, a transparent resin, a transparent glass.

Although the case where the absorbing layer 100 according to the embodiment is independent of the backlight source 200 and the liquid crystal panel 300 has been described in the above-mentioned FIG. 3, it is not limited to this example.

The absorbing layer 100 according to the embodiment may be formed integrally with the backlight source 200 and realized as the backlight source including the absorbing layer 100 according to the embodiment. The pigment according to the embodiment may be mixed into the diffusion layer 203 of the backlight source 200 and the diffusion layer 203 may also work as the absorbing layer 100 according to the embodiment.

Alternatively, the absorbing layer 100 according to the embodiment may be provided between the liquid crystal panel 351 and the polarizing plate 301 in an adhesive way using the adhesive agent.

Further, the pigment according to the embodiment may be mixed into the surface treating layer 303, the protective layer 305, the retardation layer 309, and the adhesive layer 311 of the polarizing plate 301 and the above respective layers may work also as the absorbing layer 100 according to the embodiment.

EXAMPLES

The liquid crystal display device 10 including the absorbing layer 100 according to the embodiment will be described in detail while showing the specific example, but the invention is not limited to the following example.

In the following example, the liquid crystal display device in which the absorbing layer 100 according to the embodiment is arranged between the backlight source 200 and the liquid crystal panel 300 as an optical sheet is manufactured and the hue change is examined.

Example 1

At first, the liquid crystal display device 10 including the absorbing layer 100 described below, the backlight source 200, and the liquid crystal panel 300 is manufactured.

[Backlight Source 200]

A cold-cathode tube of three wavelength types is used as the backlight source 200.

[Polarizing Plate 301]

A neutral gray for TV is used as the polarizing plate 301. The single transmittance of the polarizing plate 301 is 40 to 42% and the polarization degree is 99.9% or more.

[Liquid Crystal Cell 351]

The nematic liquid crystal with the wavelength dispersion of the refractive index $R(450 nm)/R(590 nm)=1.08$ is used as the liquid crystal layer 355, and the thickness of the liquid crystal layer 355 is adjusted so that the product $d \cdot \Delta n$ of the double refractive index $\Delta n$ of the liquid crystal and the thickness d of the liquid crystal layer is 0.28 to 0.35 μm.

[Absorbing Layer 100]

The optical sheet including the pigment for absorbing the same color light as the color (yellow color to red color) presenting when viewing the white light having passed through the liquid crystal panel 300 obliquely is arranged between the diffusion layer 203 of the backlight source 200 and the above-mentioned liquid crystal panel 300, as the absorbing layer 100.

The optical sheet is formed by adding the pigment, C.I. pigment blue 15:4 to the polymer film (cycloolefin polymer) that is the substrate. The C.I. pigment blue 15:4 is the blue color pigment of the copper phthalocyanine blue.

The difference $\Delta xy$ between color coordinates (x, y) when viewing the liquid crystal display device 10 thus manufactured from the front direction (in other words, the case of the polar angle $\theta=0°$) and the color coordinates (x, y) when viewing it from the slanting direction at the angle 60° (in other words, the direction of the polar angle $\theta=60°$) is measured.

CONVENTIONAL EXAMPLE

Similarly, the difference $\Delta xy$ between the color coordinates (x, y) when observing the liquid crystal display device including the backlight source 200 used in the Example 1 and the liquid crystal panel 300 from the front direction (in other words, the case of the polar angle θ=0°) and the color coordinates (x, y) when observing it from the oblique direction at the angle 60° (in other words, the direction of the polar angle θ=60°) is measured as the conventional example.

Example 2

A liquid crystal display device having the adhesive layer 311 also working as the absorbing layer is manufactured by adding the pigment while adjusting the pigment density to the adhesive layer 311 of the polarizing plate 301 arranged at the side of the backlight source 200, instead of having the absorbing layer with the dyed polymer film. The same backlight source 200 and the same liquid crystal cell 351 as those in the Example 1 are used. A change of the color coordinates in the liquid crystal display device is measured in the same way as in the Example 1.

Example 3

A liquid crystal display device having the surface treating layer 303 also working as the absorbing layer is manufactured by adding the pigment while adjusting the pigment density to the surface treating layer 303 of the polarizing plate 301 arranged at the side of the backlight source 200, instead of having the absorbing layer with the dyed polymer film. The same backlight source 200 and the same liquid crystal cell 351 as those of the Example 1 are used. A change of the color coordinates in the liquid crystal display device is measured in the same way as in the Example 1.

Example 4

A liquid crystal display device having the protective layer 305 also working as the absorbing layer is manufactured by adding the pigment while adjusting the pigment density to the protective layer 305 of the polarizing plate 301 arranged at the side of the backlight source 200, instead of having the absorbing layer with the dyed polymer film. The same backlight source 200 and the same liquid crystal cell 351 as those of the Example 1 are used. A change of the color coordinates in the liquid crystal display device is measured in the same way as in the Example 1.

Example 5

A liquid crystal display device is manufactured by providing the same optical sheet as that of the Example 1 between the light source unit 201 and the diffusion layer 203 of the backlight source 200 and using the liquid crystal panel 300 used in the Example 1. A change of the color coordinates in the liquid crystal display device is measured in the same way as in the Example 1.

The measurement results of the above-mentioned conventional example and Examples 1 to 5 are shown in the following Table 1.

TABLE 1

|  | Δxy |
|---|---|
| Conventional Example | 0.041 |
| Example 1 | 0.025 |
| Example 2 | 0.022 |
| Example 3 | 0.025 |
| Example 4 | 0.021 |
| Example 5 | 0.033 |

As is apparent from the comparison between the Examples 1 to 4 of the Table 1 and the conventional example, it is found that the change of the color coordinates in the liquid crystal display device including the absorbing layer according to the embodiment is smaller than that of the liquid crystal display device in related art. It means that the difference between the color coordinates when viewing the liquid crystal display device from the front direction and the color coordinates when observing it from the oblique direction is small and that the hue change in the liquid crystal display device in related art is improved in the Examples 1 to 4.

As is clear from the comparison between the Example 5 of the Table 1 and the Example 1 of the Table 1, it is found that the change of the color coordinates in the Example 5 is larger than that of the Example 1. It indicates that since the light with the yellow-red color light absorbed by the absorbing layer 100 is scattered by the scattering layer 203, the effect of the absorbing layer according to the embodiment can be rarely obtained. As is apparent from the result, it is found that the resultant effect is greater in the case where any member or structure having strong diffuseness is not provided between the absorbing layer according to the embodiment and the liquid crystal layer.

Example 6

Figure 4:
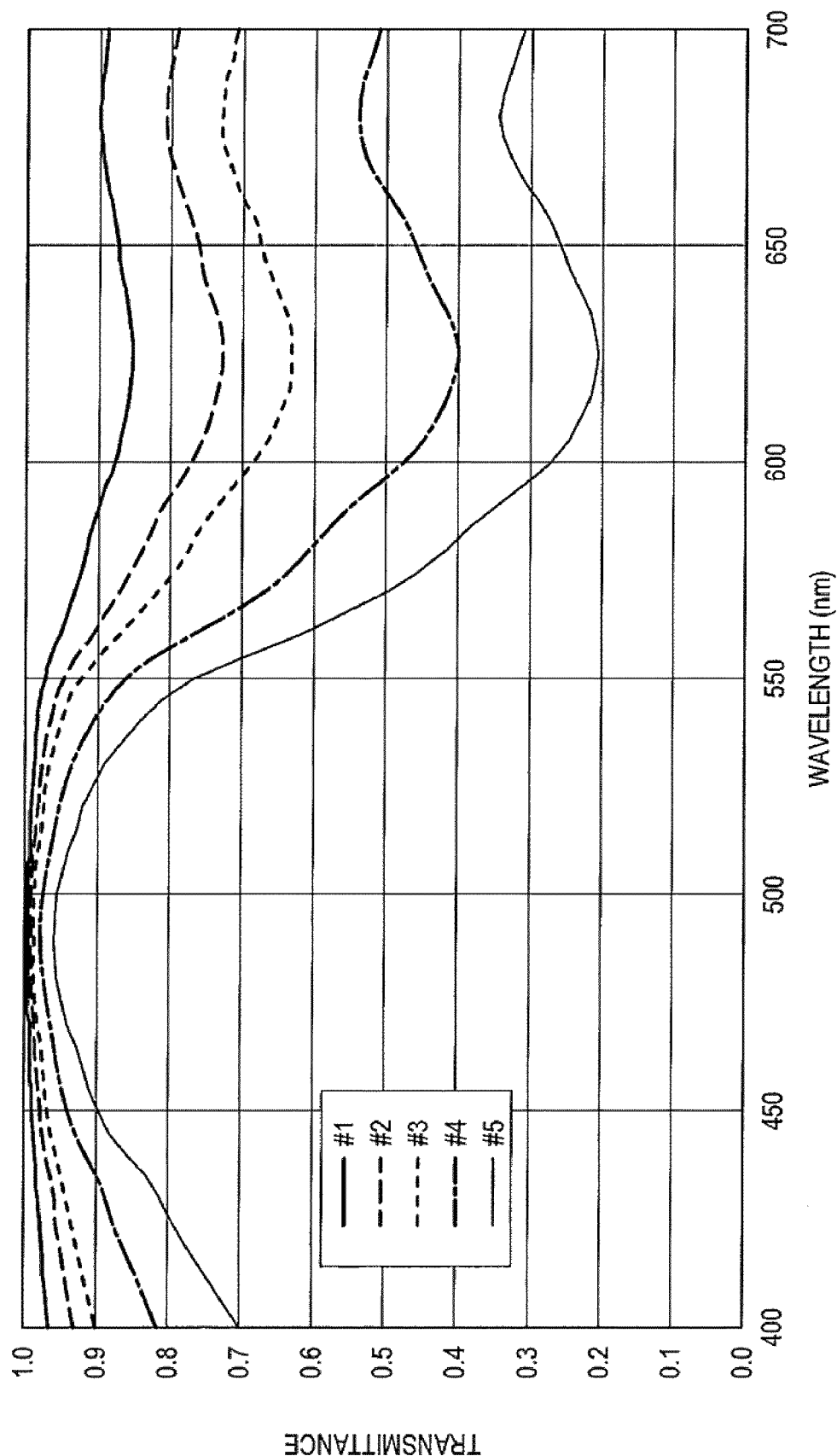
FIG. 4 is a graph showing the transmittance from a front view of the absorbing layer used in the embodiment.

Next, the pigment density of the optical sheet that is the absorbing layer is changed, and the visual evaluation is performed about the relation between the transmittance of the absorbing layer 100 and the effect of the absorbing layer 100 according to the embodiment in the liquid crystal display device shown in the Example 1. FIG. 4 is the transmittance from the front view of the absorbing layer used for the evaluation and the following Table 2 is the result of the visual evaluation of the liquid crystal display device using each absorbing layer.

In the Example, the pigment density is changed in five stages from #1 to #5 as shown in FIG. 4 and the Table 2. The reference number #1 shows the lowest pigment density and #5 shows the highest pigment density.

TABLE 2

| SAMPLE | MINIMUM TRANSMITTANCE (%) | VISUAL EVALUATION WHEN OBSERVED FROM THE FRONT DIRECTION | VISUAL EVALUATION WHEN OBSERVED FROM THE OBLIQUE DIRECTION |
|---|---|---|---|
| #1 | 85 | ◯ | ◯ EFFECTIVE (SMALL COLOR CHANGE) |
| #2 | 73 | ◯ | ◯ EFFECTIVE (SMALL COLOR CHANGE) |
| #3 | 62 | ◯ | ◯ EFFECTIVE (SMALL COLOR CHANGE) |
| #4 | 40 | X EXTREME DECREASE OF BRIGHTNESS (LOOK DARK) | Δ EFFECT TOO STRONG |

TABLE 2-continued

| SAMPLE | MINIMUM TRANSMITTANCE (%) | VISUAL EVALUATION WHEN OBSERVED FROM THE FRONT DIRECTION | VISUAL EVALUATION WHEN OBSERVED FROM THE OBLIQUE DIRECTION |
| --- | --- | --- | --- |
| #5 | 20 | X EXTREME DECREASE OF BRIGHTNESS (LOOK DARK) | Δ EFFECT TOO STRONG |

As is clear from FIG. 4, it is found that the transmittance in the wavelength band of 400 to 700 nm decreases on the whole according to an increase in the pigment density. Further, it is found that the used C.I. pigment blue 15:4 has the maximum absorption wavelength in 620 to 630 nm.

With reference of the Table 2, since the visual evaluation when observing the liquid crystal display device from the front direction is good and the degree of the color change in the usual evaluation when observing it obliquely is small in #1 to #3 in which the minimum transmittance is 60% or more, apparently the effect of the absorbing layer is large.

In #4 and #5 in which the minimum transmittance is less than 60%, since the brightness even when viewing the liquid crystal display device from the front direction decreases extremely, the effect of the absorbing layer is too strong in the case of observing it obliquely in which the optical path length is longer than that in the case of observing from the front direction and a proper color compensation is not performed.

As is clear from the result, the minimum transmittance of the absorbing layer 100 is preferably 60% or more.

Example 7

Figure 5:
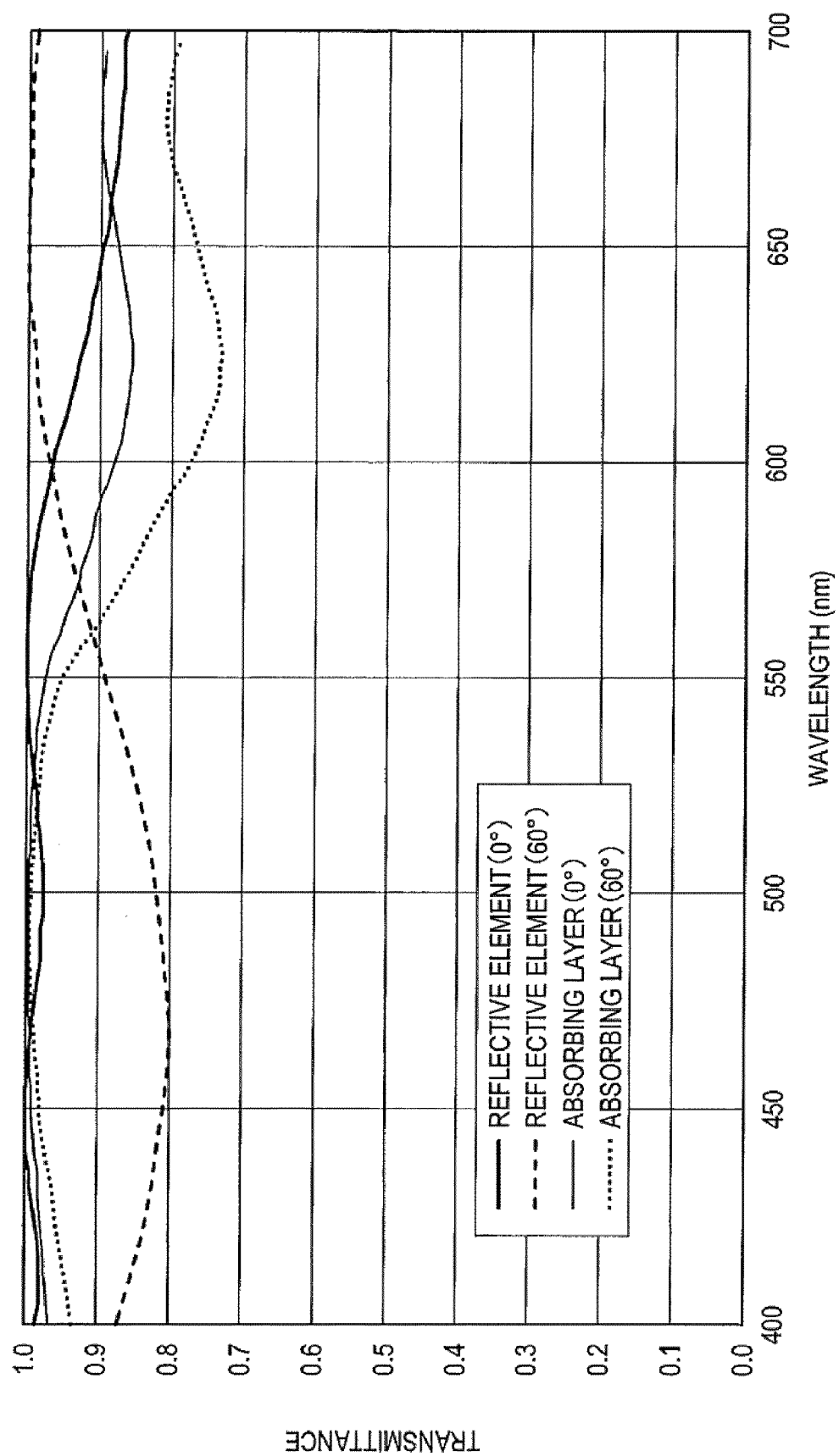
FIG. 5 is a graph showing the spectral transmittance of the absorbing layer and a reflective optical element used in the embodiment.

Next, a comparison is performed between the absorbing layer used in the Example 1 and a reflective optical element adjusted to obtain the same effect by stacking the layers having the different refractive indexes. The comparison is performed by measuring the spectral transmittance respectively in the case of observing from the front direction (the polar angle θ=0°) and in the case of observing from the oblique direction of 60° (polar angle θ=60°). The comparison result is shown in FIG. 5. FIG. 5 is a graph showing the spectral transmittance between the absorbing layer used for the Example and the reflective optical element.

Since the interference condition changes largely according to the viewing angle in the reflective optical element for controlling the transmittance using reflection and interference of light, it is found that a deviation occurs in the wavelength showing the minimum transmittance, as shown in FIG. 5. Specifically, although the wavelength showing the minimum transmittance in the reflective optical element exists in the vicinity of around 700 nm in the case of observing it from the front direction, it shifts to the vicinity of 470 nm in the case of observing it from the 60° direction. It indicates that the color of the element itself seems different between the case of observing the reflective optical element from the front direction and the case of observing it from the oblique direction.

On the other hand, in the absorbing layer according to the Example, it is found that no shift occurs in the wavelength showing the minimum transmittance in the case of observing it from the front direction and in the case of observing it from the oblique direction. It shows that the color of the absorbing layer does not change even when the viewing direction changes.

As mentioned above, though the coloring in the case of observing the liquid crystal display device obliquely is caused by the light of unnecessary color passing through the liquid crystal panel, it is possible to improve the coloring by absorbing the above-mentioned unnecessary light with the absorbing layer 100 according to the embodiment.

When the white light obliquely passes through the absorbing layer 100 according to the embodiment, the optical path length is longer compared with the case of passing in the front direction. Therefore, the effect of the absorbing layer is much greater in the case of observing it obliquely and the obliquely coloring can be improved more effectively.

Further, the behavior of the color change in the liquid crystal panel when the polar angle is slanting from 0° is similar to the behavior of the color change in the absorbing layer 100 and the difference of the effect according to a change of the viewing angle does not appear clearly.

In this way, the hue change in the white display in the case of observing from the wide-angle can be controlled by using the absorbing layer according to the embodiment.

The present application contains subject matter related to that disclosed in Japanese Priority Patent Application JP 2008-102745 filed in the Japan Patent Office on Apr. 10, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A liquid crystal display device, comprising:
a liquid crystal panel which has a liquid crystal cell including a predetermined liquid crystal layer and polarizing plates for holding the liquid crystal cell;
a backlight source which is arranged on a rear side of the liquid crystal panel, for irradiating the liquid crystal panel with white light; and
an absorbing layer which is provided between a portion of the backlight source and the liquid crystal cell, the absorbing layer being configured to absorb a predetermined wavelength band of the white light, the absorption of the predetermined wavelength band compensation for a change in a color of the white light passing through the liquid crystal panel in an oblique direction with respect to a normal direction of the liquid crystal panel, and the degree of absorption being dependent upon a length the white light travels through the absorbing layer and independent of a direction at which the white light travels through the absorbing layer.

2. The liquid crystal display device according to claim 1, wherein the predetermined wavelength band corresponds to yellow-red color.

3. The liquid crystal display device according to claim 2, wherein the absorbing layer is formed by a chemical compound with the maximum absorption wavelength existing in a visible light region of 580 nm or more.

4. The liquid crystal display device according to claim 1, wherein transmittance in the normal direction of the absorbing layer is 60% or more in the visible light region.

5. The liquid crystal display device according to claim 1, wherein the absorbing layer is an optical film arranged on a path of the white light.

6. The liquid crystal display device according to claim 1, wherein the absorbing layer is provided as an adhesive layer for attaching the liquid crystal cell to the polarizing plate adhesively.

7. The liquid crystal display device according to claim 1, wherein the absorbing layer is provided in the backlight source.

8. The liquid crystal display device according to claim 1, wherein a scattering member for scattering the light which has passed through the absorbing layer does not exist between the absorbing layer and the liquid crystal panel.

9. A polarizing plate for a liquid crystal display device, comprising:
   a polarization layer which controls polarization of incident light; and
   an absorbing layer which is arranged on a path of the incident light, for absorbing a predetermined wavelength band of the incident light, the absorption of the predetermined wavelength band compensating for a change in a color of white light passing through a liquid crystal panel of the liquid crystal display device in an oblique direction with respect to a normal direction of the liquid crystal panel, the degree of absorption being dependent on a length the incident light travels through the absorbing layer and being independent of a direction at which the incident light travels through the absorbing layer.

10. A backlight source for a liquid crystal display device, comprising:
   a light source unit which irradiates white light;
   a scattering layer which scatters the white light; and
   an absorbing layer which is arranged on a path of the white light, for absorbing a predetermined wavelength band of the white light, the absorption of the predetermined wavelength band compensating for a change in a color of white light passing through a liquid crystal panel of a liquid crystal display device in an oblique direction with respect to a normal direction of the liquid crystal panel, the degree of absorption being dependent on a length the white light travels through the absorption layer and being independent of a direction at which the white light travels through the absorbing layer.

* * * * *